US007760914B2

(12) United States Patent
Santamaria et al.

(10) Patent No.: US 7,760,914 B2
(45) Date of Patent: Jul. 20, 2010

(54) ALGORITHM FOR LINE TRACKING USING A CIRCULAR SECTOR SEARCH WINDOW

(75) Inventors: Carlos Santamaria, Surrey (GB); Miroslaw Bober, Surrey (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1019 days.

(21) Appl. No.: 11/149,279

(22) Filed: Jun. 10, 2005

(65) Prior Publication Data
US 2005/0283310 A1    Dec. 22, 2005

(30) Foreign Application Priority Data
Jun. 16, 2004    (EP) ................... 04253602

(51) Int. Cl.
*G06K 9/00* (2006.01)
*G06K 9/48* (2006.01)
(52) U.S. Cl. .................. 382/113; 382/103; 382/199
(58) Field of Classification Search ................. 382/100, 382/103, 109, 113, 199
See application file for complete search history.

(56) References Cited

U.S. PATENT DOCUMENTS

2003/0223615 A1    12/2003    Keaton et al.

OTHER PUBLICATIONS

Ma et al., "Detection of Curved Road Edges in Radar Images Via Deformable Templates," in Proc. IEEE. Intl. Conf.Image Proc., 1997, pp. 857-860.*

Bonnefon, R. et al., "Automatic Tracking of Linear Features on SPOT Images Using Dynamic Programming," *EOS/SPIE EUROPTO'1999 Image and Signal Processing for Remote Sensing V*, Sep. 1999, pp. 116-124.
Bonnefon, R. et al., "Geographic Information System Updating Using Remote Sensing Images," Pattern Recognition Letters, vol. 23, No. 9, Jul. 2002, pp. 1073-1083.
Byoung-Ki Jeon et al., "Road Detection in Spaceborne SAR Images Using a Genetic Algorithm," *IEEE Transactions on Geoscience and Remote Sensing*, vol. 40, No. 1, Jan. 2002, pp. 22-29.
Duta, N., "Road Detection in Panchromatic SPOT Satellite Images," ICPR 2000, vol. 113, pp. 1-4.
Fischler, M.A. et al., "Detection of Roads and Linear Structures in Low-Resolution Aerial Imagery Using a Multisource Knowledge Integration Technique," *Computer Graphics and Image Processing*, vol. 15, 1981, pp. 201-223.
German, D. et al., "An Active Testing Model for Tracking Roads in Satellite Images," *IEEE Transactions on Pattern Analysis and Machine Intelligence*, vol. 18, No. 1, Jan. 18, 1996, pp. 1-14.
Porikli, F. et al., "An Unsupervised Road Extraction Algorithm for Very Low-Resolution Satellite Imagery," (Sep. 9, 2000), *International Workshop on Pattern Recognition in Remote Sensing*, pp. 76-83.

* cited by examiner

*Primary Examiner*—Vu Le
*Assistant Examiner*—Soo Jin Park
(74) *Attorney, Agent, or Firm*—Birch, Stewart, Kolasch & Birch, LLP.

(57) ABSTRACT

A method of identifying or tracking a line in an image comprises determining a start point that belongs to a line, and identifying a plurality of possible end points belonging to the line using a search window, and calculating values for a plurality of paths connecting the start point and the end points to determine an optimum end point and path, characterised in that the search window is non-rectangular.

9 Claims, 5 Drawing Sheets

ALGORITHM FOR LINE TRACKING USING A CIRCULAR SECTOR SEARCH WINDOW

The invention relates to a method and apparatus for detecting or tracking lines in an image.

M. A. Fischler, J. M. Tenenbaum, and H. C. Wolf, *Detection of roads and linear structures in low-resolution aerial imagery using a multisource knowledge integration technique*. CVGIP, 15, pp. 201-223, 1981 is the precursor of an important part of the literature on road detection. It uses for the first time the Duda Road Operator and introduces the F* algorithm.

Description of the algorithm: a cost is assigned to each pixel in a search region (which can be the whole image), indicating the probability of the pixels belonging to a road. Then the F* algorithm is used to find the optimum path between the starting and ending delimiters (which have to be provided beforehand). This method can be applied to regions in images, but the regions are isolated, and there is no reference in the paper to any method to track roads along neighbouring regions.

Duta, N. *Road Detection in Panchromatic SPOT Satellite Images*. Proceedings ICPR, 2000, Track4: Applications, Robotics, Systems and Architectures, pp. 308-311 describes a 2-stage algorithm. In the first stage, the road seeds are found; in the second stage, the seeds are tracked or extended.

In this algorithm, a seed is a parallelogram shaped region of the image, 2-4 pixels wide, 10-15 pixels long, which is visually homogeneous and well separated from the nearby background. It does not have to be in a straight line.

In the tracking stage, the algorithm tries to extend the seeds by both ends. The extensions are always in a straight line. Starting from one end of the seed, it defines a number of straight segments that extend the seed in a circular sector (−45°,+45° in the paper, but it depends on an a priori knowledge of the geometry of the roads), and computes the probability of each segment to be part of a road. This probability is defined as a measure of homogeneity of the pixels in the segment and separability of the segment from the nearby background. If the probability of any segment exceeds a threshold, the seed is extended along the best segment and the process continues iteratively.

Bonnefon, R., Dherete, P. and Desachy, J. *Automatic tracking of linear features on SPOT images using dynamic programming*. Proceedings EOS/SPIE EUROPTO'1999 Image Signal Processing for Remote Sensing V, pp. 116-124, September 1999 describes another method of tracking lines.

Based on a starting point and a starting direction, a small search (rectangular) window is defined, with the starting point in the middle of the first column and several candidate points on the last column. For each candidate point, a cost is assigned to each point in the search window as a function of the intensities of that point and the intensities of the starting and the candidate points. Then, the F* algorithm is used to determine the optimum path between the starting point and candidate point, and a mark is given to the path considering the homogeneity of radiometry along the path and the total cost of the path returned by the F* algorithm. The candidate point with highest mark becomes the new starting point, and the process continues with a new search window. FIG. 1 shows a search window and FIG. 2 shows a tracking structure of the method of Bonnefon et al.

The present invention is concerned with the problem of tracking line structures once some information about the lines is available (seeds). Seeds are short segments that are known to be part of the lines that are being searched for.

The algorithm has been developed for the detection of roads in satellite images, but it can be applied to the detection of other line structures.

Fischler et al. detect lines in regions, but do not use tracking to continue line structure between neighbouring regions.

Duta uses tracking but the extensions are always linear segment. The main limitation of this algorithm is that, although it can cope with curvatures in a global scale (allowing angles between one extension segment and the next one), it can't cope with it in a local scale (the extension segments are always straight lines).

Bonnefon et al. use rectangular windows to perform the tracking. This algorithm can result in non-linear extensions, but there are several limitations in the lines that can be tracked due to the search window used (rectangular). The first problem is that, as the value of each point in the window represents the probability of that point to be a road, it is clear that the candidate most likely to be selected as best candidate is the one in the middle of the last column, as its distance from the starting point is minimum. This can be seen as a positive bias, as it enforces the piecewise linearity of the roads, but in many cases can result in the selection of a non-optimal candidate.

Another problem of this method is that it allows the selection as optimum of paths that are clearly wrong from a geometric point of view. For example, the path in FIG. 3 can be selected as the optimum path by this algorithm, but based on the geometric constraints of the roads, it is unlikely to be a road, specially considering the fact that the size of the search window has been determined according to the geometrical features of the expected roads (e.g. degree of curvature).

The algorithm locates the candidate points perpendicular to the starting direction. This strategy can make impossible to track certain road structures, like L or U turns (FIG. 4). These kinds of turns will not be tracked no matter how big the search window is.

The algorithm also assumes that any point of the searched road is beyond the starting point (in the direction of the estimated starting direction). This might not be the case in very winding roads (see FIG. 5). In this scenario, this algorithm will miss some points of the road, regardless of the size of the window.

The invention presented in this paper addresses these limitations, preferably by using a circular sector shaped window.

Aspects of the invention are set out in the accompanying claims.

According to one aspect, the inventive idea is a tracking algorithm based on a new search window (circular sector shaped). The new search window addresses problems associated with the traditional rectangular window, as it is more suited to typical road geometries that the traditional one. With the new search window, only the pixels that are, from a geometric point of view, likely to belong to a road will be used to determine the optimum path in the window. The new search window also can cope with particular road structures like L or U turns. Embodiments of the invention present the same implementation complexity as the methods based on the traditional rectangular window.

An embodiment of the invention will be described with reference to the accompanying drawings of which:

The algorithm of the embodiment uses a search window and dynamic programming (F* algorithm) to extend the seeds along the most probable path. The algorithm is applied to both ends of all the seeds in the image. At the start of this process, the value of each point in the image represents the probability of that point to be part of a line structure. This can be done using a suitable known technique, such as a Duda Road Operator, and can be used to determine the seeds.

Figure 6:
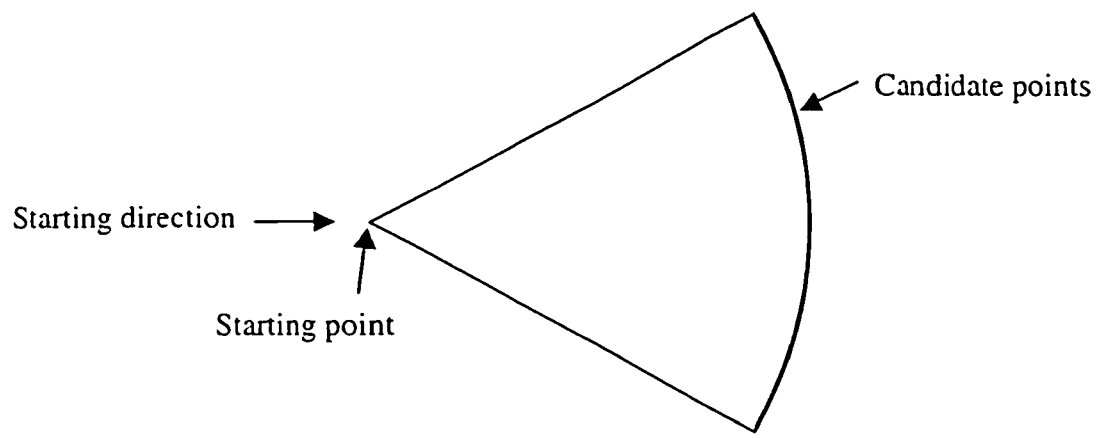
FIG. 6 shows schematically a search window of a method of an embodiment of the invention.
Figure 7:
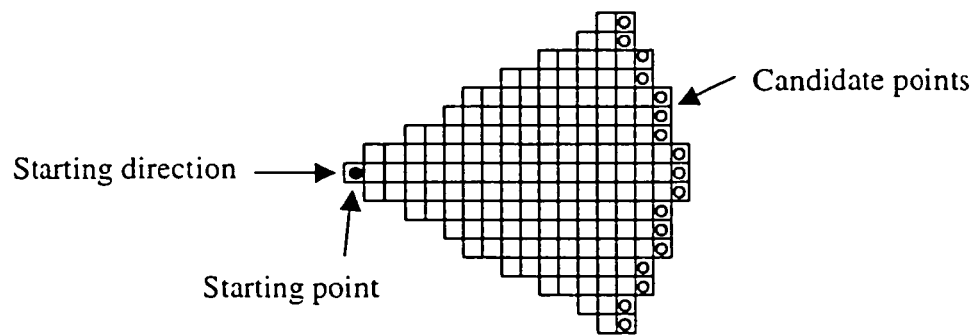
FIG. 7 shows a digitised version of the search window of FIG. 6.
Figure 8:
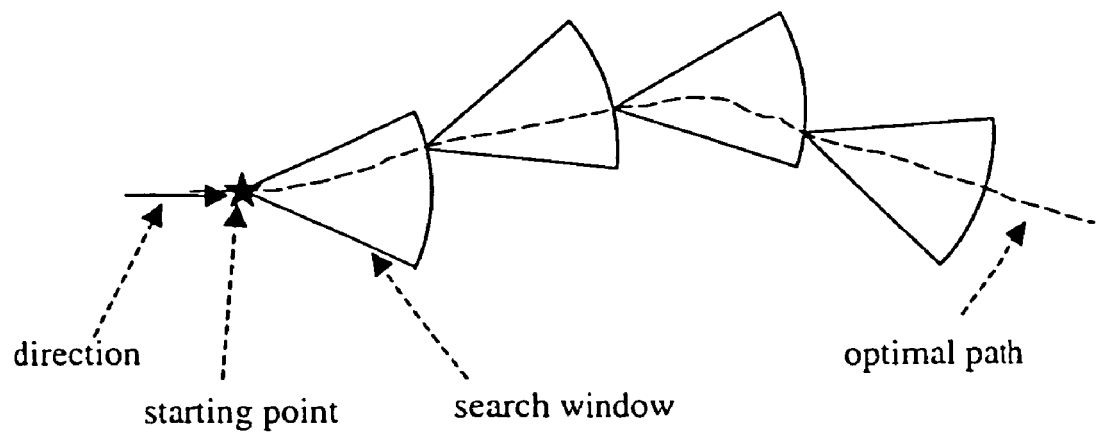
FIG. 8 illustrates line tracking according to a method of an embodiment of the invention.

The search window used in the algorithm of this embodiment has the shape of a circular sector and not that of a rectangle. For each end of each seed, the circular sector is placed in such a way that the vertex of the sector (the starting point) is the final point of the seed, the orientation of the sector is based on an estimation of the direction of the line and the angle of the sector is a function of the a priori knowledge of the geometry of the lines in the image (degree of curvature). For example, if the lines being tracked are roads in a satellite image and the roads present in the image are known to be motorways or straight roads, the angle of the sector should be small (typically 45 degrees). If the roads are known to be very winding (i.e., mountain roads) the angle should be large (even greater than 180 degrees). If no a priori knowledge of the geometry of the roads is available, a value of 90 degrees should perform well in most cases. The points which are considered for ends of the extension are located on the circumference that delimits the circular sector. The F* algorithm is used to calculate the costs of the optimum paths between the starting point and each candidate point. The candidate with lower cost is picked and, if its cost meets a certain threshold, the tracking will continue with that candidate as the starting point in another circular sector search window. FIG. 6, FIG. 7 and FIG. 8 graphically describe the search window and the tracking procedure. The extension of that line finishes when there is not a suitable candidate to carry on with the extension or the border of the image is reached. The algorithm is then applied to the other end of the seed, and to the rest of the seeds in the image.

The advantages of this method are:

The distances between the starting point and all the candidate points are, in theory, exactly the same. In practice, the distances are only approximately the same due to digitalisation. When the search window is rectangular, there are noticeable differences between these distances.

Figure 1:
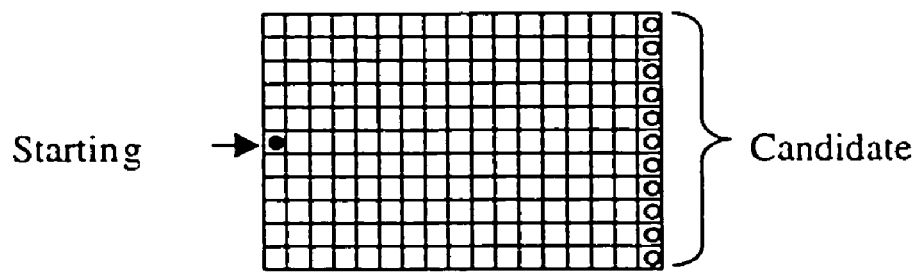
FIG. 1 shows a search window of a method of the prior art.
Figure 2:
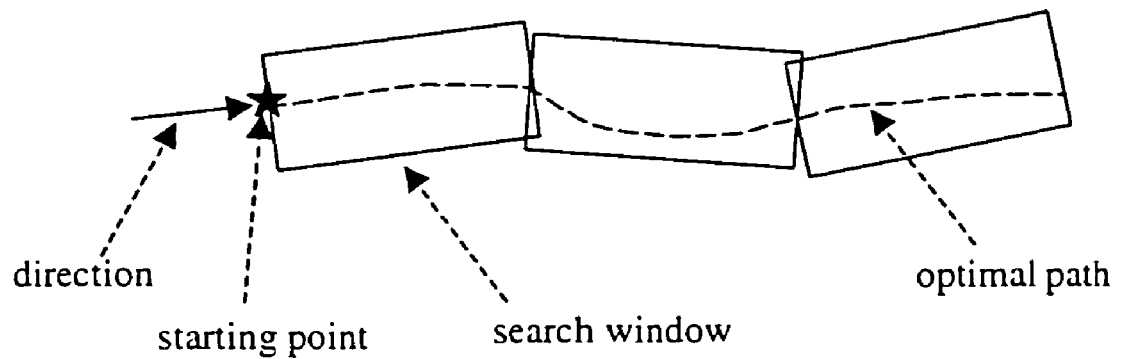
FIG. 2 shows a tracking structure of a method of the prior art.
Figure 3:
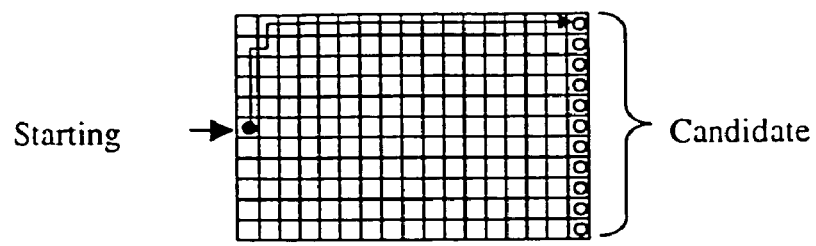
FIG. 3 shows a possible path of a method of the prior art.
Figure 4:
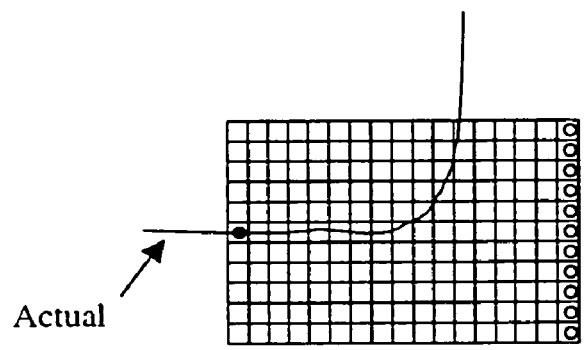
FIG. 4 shows an undetected path of a method of the prior art.
Figure 5:
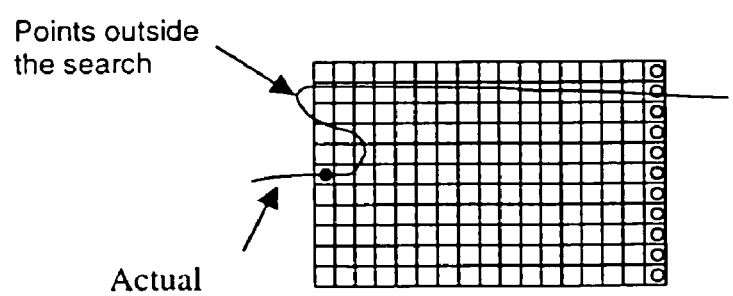
FIG. 5 shows another undetected path of a method of the prior art.

Only the pixels in the circular sector can be selected as part of the optimum path. This prevents situations as the one presented in FIG. 3. In a typical road, in the vicinity of the starting point the number of pixels that can be part of the optimum path is very limited, as there is a high certainty about the location of the road thanks to the knowledge of the starting point and the starting direction. This number increases as we get further from the starting point. The circular sector search window matches this behaviour.

Figure 9:
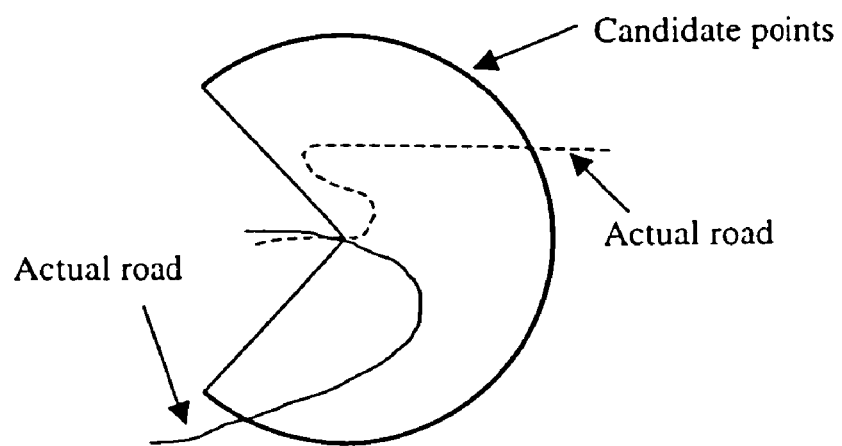
FIG. 9 illustrates lines that can be tracked by a method of an embodiment of the invention.

No assumption about the location of the road is made in this method. If the geometry of the expected roads is known to be very winding, the algorithm can cope with road points located before the starting point, or with L or U turns, as shown in FIG. 9.

Other features of the algorithm:

As a safe margin, the tracking can be continued not from the candidate point itself, but from one or two points before (along the optimum path between the starting point and the candidate point).

Figure 10:
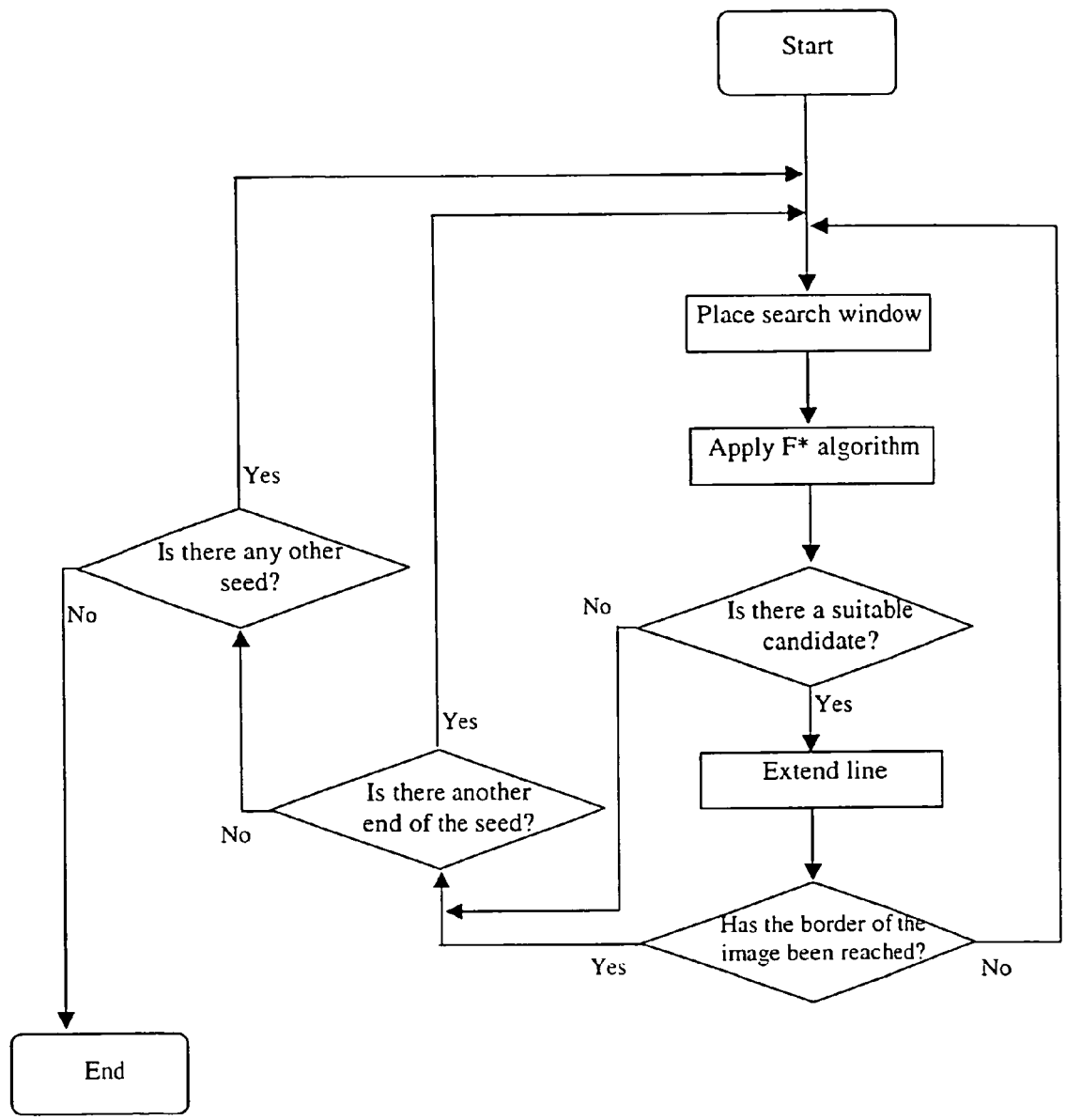
FIG. 10 is a flow diagram of a method of an embodiment of the invention.

FIG. 10 shows the flow chart diagram of the algorithm.

The algorithm was originally designed to track roads in satellite images, but it can also be used to track other structures such as train lines, canals, coastlines and, in general, any narrow and linear structure in satellite or aerial images.

Outside the remote sensing scenario, the algorithm was also used to detect face wrinkles. It could also be applied to medical images.

Although the embodiment uses a circular sector for the search window, other non-rectangular shapes can be used such as triangular. The angle subtended at the vertex (starting point) can vary between 0 and 360 degrees and can be fixed or variable and can be determined by the application or knowledge about the image, e.g. knowledge about the nature of the image, geometry, or typical degree of curvature of lines in the image.

In the specification, the term image means a whole image or a region of an image, except where apparent from the context. Similarly, a region of an image can mean the whole image. An image includes a frame or a field, and relates to a still image or an image in a sequence of images such as a film or video, or in a related group of images.

The image may be a grayscale or colour image, or another type of multi-spectral image, for example, IR, UV or other electromagnetic image, or an acoustic image etc.

The invention can be implemented for example in a computer system, with suitable software and/or hardware modifications. For example, the invention can be implemented using a computer or similar having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as chips. Components of a system in an apparatus according to an embodiment of the invention may be provided remotely from other components, for example, over the internet.

The invention claimed is:

1. A method of identifying or tracking a line in an image comprising the steps of:

determining a start point that belongs to a line;

identifying a plurality of possible end points belonging to the line using a search window, wherein the search window is a circular sector with a vertex at the start point;

calculating values for a plurality of paths connecting the start point and each possible end point, wherein only pixels in the search window are selected as part of a path; and determining an optimum path between the start point and an optimum end point on the basis of the calculated values.

2. The method of claim 1 wherein an angle of the circular sector is defined based on a nature of lines in the image, wherein the nature of the lines in the image includes at least one of a geometry and degree of curvature of the lines in the image.

3. The method of claim 1 wherein an angle subtended by the vertex is 90 degrees without knowledge of a nature of the line, wherein the nature of the line includes at least one of a geometry and degree of curvature of the line.

4. The method of claim 1 wherein the end points are arranged along a circumference of the circular sector.

5. The method of claim 1, wherein the step of calculating values for a plurality of paths between the start point and an end point includes at least one of straight paths and curved paths connecting the start and end point in the search window.

6. The method of claim 1, comprising using an F* algorithm to calculate the values for a plurality of paths and to determine an optimum path.

7. The method of claim 1, comprising repeating the steps to track a line through the image.

8. Apparatus adapted for carrying out a method of claim 1.

9. A computer readable recording medium storing a computer program capable of being executed by a computer to perform a method of identifying or tracking a line in an image comprising:

determining a start point that belongs to a line;

identifying a plurality of possible end points belonging to the line using a search window, wherein the search window is a circular sector with a vertex at the start point;

calculating values for a plurality of paths connecting the start point and each possible end point, wherein only pixels in the search window are selected as part of a path; and determining an optimum path between the start point and an optimum end point on the basis of the calculated values.

* * * * *